United States Patent Office 3,121,552
Patented Feb. 18, 1964

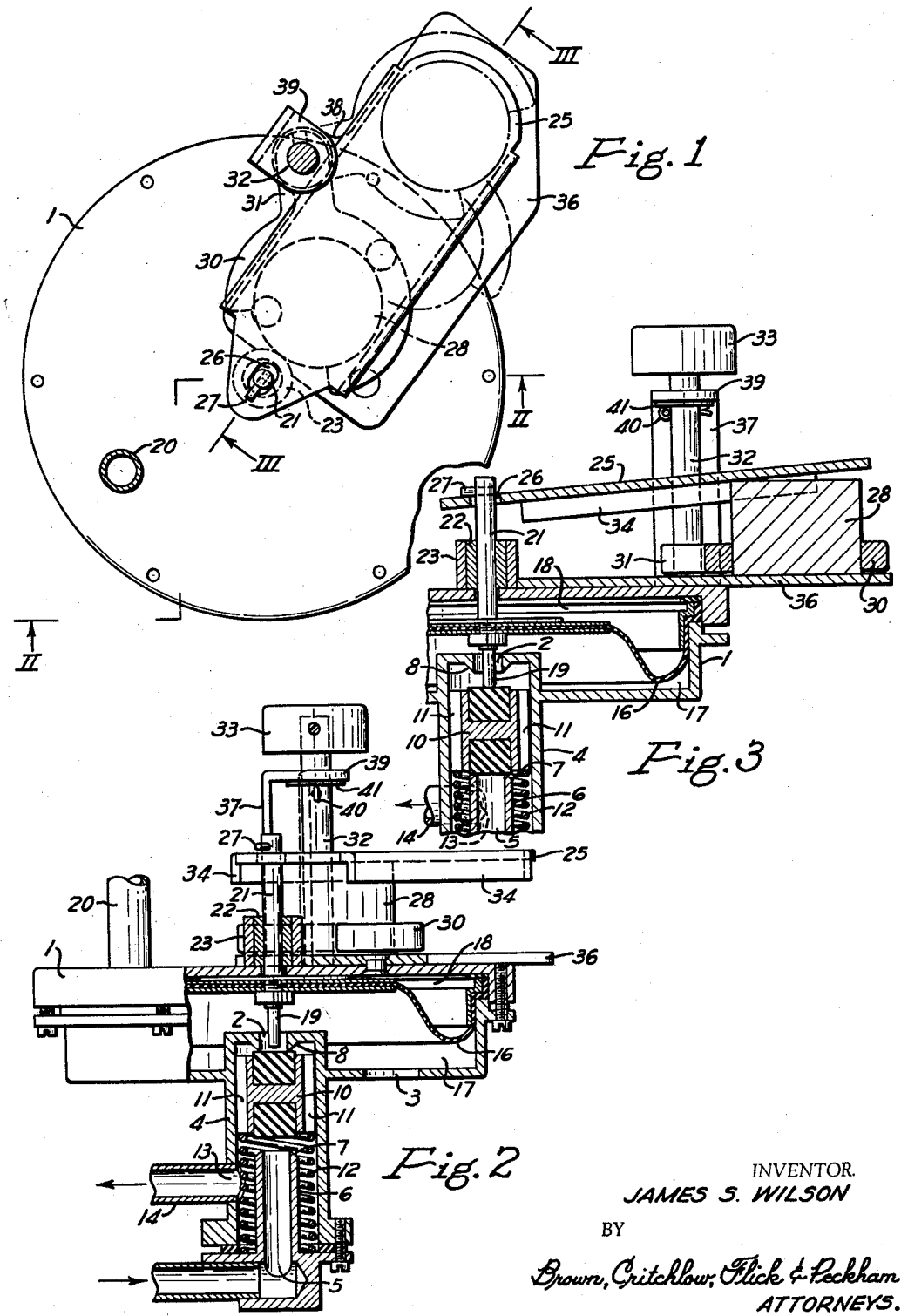

3,121,552
ADJUSTABLE FLUID PRESSURE
CONTROLLED VALVE
James S. Wilson, Riviera Beach, Fla., assignor to Mine
Safety Appliances Company, Pittsburgh, Pa., a corporation of Pennsylvania
Filed Nov. 1, 1962, Ser. No. 234,788
8 Claims. (Cl. 251—61)

This invention relates to fluid pressure controlled valves, and more particularly to those wherein means are provided for varying the pressure at which the valves will operate.

It is among the objects of this invention to provide such a valve, which can readily be adjusted in a simple and inexpensive manner to operate at different fluid pressures.

In accordance with this invention a valve housing is provided with a port controlled by a closure member that can be moved by shifting means, such as a diaphragm, responsive to changing fluid pressure in the housing at one side of the shifting means. Facing the housing is a steel lever that has one end pivotally connected with the shifting means, by which it is movable. Between the lever and housing there is a magnet that has a surface normally engaged by the adjacent side of the lever and having an edge serving as a fulcrum for the lever. The housing is provided with a metal surface engaged by the magnet and to which it is attracted for holding the magnet. The magnet resists tilting of the lever on the fulcrum edge of the magnet by the shifting means until fluid pressure against one side of the latter differs from the pressure against the opposite side sufficiently to overcome the attraction of the magnet for the lever. The magnet is adjustable lengthwise of the lever to change the distance between the fulcrum edge and the ends of the lever, whereby to vary the resistance of the lever to being tilted by the shifting means.

The preferred embodiment of the invention is illustrated in the accompanying drawings, in which—

FIG. 1 is a plan view of my valve;

FIG. 2 is a combined elevation and cross section taken on the line II—II of FIG. 1; and FIG. 3 is a cross section taken on the line III—III of FIG. 1 showing the valve open and the magnet in its outer position.

Referring to FIG. 2 of the drawings, the valve has a housing 1, in one side of which there is a port 2, such as an inlet port, preferably at the center. The housing also is provided between the port and the side wall of the housing with an opening 3 that may serve as an outlet. Extending outward from the port is a cylindrical extension 4 of the housing, which is provided at its outer end with a fluid pressure fluid inlet 5 encircled by an inwardly extending short tube 6. The inner end of this tube forms a valve seat 7 opposite the valve seat 8 around the housing inlet port 2.

Slidably mounted inside of extension 4 between the two valve seats is a closure member 10 provided with circumferentially spaced passages 11 connecting its opposite ends around its periphery. Preferably, the closure member is held against seat 8 by a coil spring 12 compressed between the closure and the outer end of the extension. Between seat 7 and the outer end of extension 4, the latter is provided with a lateral opening 13 that is connected by a conduit 14 with something, such as another valve, which is to be controlled by the pressure of fluid entering through inlet 5. It will be seen that if the closure member is moved from seat 8 to the other seat, the inlet will be closed and the lateral opening 13 will be connected through the inlet port 2 and outlet 3 with the atmosphere.

In order to move the closure member from housing port 2 to the inlet seat 7, shifting means are mounted inside the valve housing. Although the shifting means may take the form of bellows or the like, it is preferred to use a simple flexible diaphragm 16, the edge of which is clamped in the housing to separate it into inner and outer chambers 17 and 18, respectively. The inner side of the diaphragm is provided with a central pin 19 that extends into port 2 for pushing the closure member away from that port and against the seat 7 when the diaphragm is forced inwardly by fluid pressure delivered to outer chamber 18 through an opening 20 in the side of the housing opposite the central port. The diaphragm is guided by a stem 21, which may be integral with the pin, extending out through the housing through a central hole and slidably mounted in a sealing bushing 22 mounted in a flange 23 projecting from the housing. The outer end of the stem projects beyond the flange.

It is a feature of this invention that the resistance of the diaphragm to being moved inwardly toward closure member 10 can be varied in order to change the fluid pressure that is required in the outer chamber 18 to move the diaphragm. Accordingly, a lever 25 has one end pivotally connected to the outer end of stem 21, from which the lever extends outward across the housing. The pivotal connection can be made, as shown in FIGS. 1 and 3, by providing the lever with a short longitudinal slot 26 that receives the stem, on which the lever is held by a retaining member 27 on the stem engageable with the outer surface of the lever. The inner surface of the lever engages the outer side of a magnet 28 that engages a metal surface, with which the housing is provided. The lever-engaging edge of the magnet nearest the diaphragm stem serves as a fulcrum for the lever, on which the lever must tilt if the diaphragm is to move toward the closure member. In other words, when fluid under pressure is delivered to the outer chamber of the housing, it presses against the diaphragm and when the pressure becomes great enough to overcome the attraction of the magnet for the lever, the diaphragm will start to move and tilt the lever on the magnet.

To vary the resistance of the lever to being tilted by the diaphragm, the magnet can be adjusted lengthwise of the lever, which will change the distance between its fulcrum edge and stem 21. The farther the magnet is removed from the stem, the longer the lever arm will become and the easier it will be for the diaphragm to tilt the lever, whereby less fluid pressure will be required for moving the diaphragm. Although the magnet could simply be moved along the lever by hand, it is preferred to mount the magnet in such a manner that it cannot accidentally be separated from the housing and magnet. A convenient way of doing this is to use a circular magnet and insert it in an encircling yoke 30. The yoke has a radial projection 31 that is rigidly mounted at one side of the lever on a shaft 32 parallel to the diaphragm stem. The shaft is rotatably mounted so that it can be turned by a knob 33 or the like on its outer end to swing the yoke toward and away from the inner end of the lever. To keep the magnet aligned with the lever, the latter is provided with side flanges 34 that overlap opposite sides of the magnet and compel the lever to rotate around the stem a few degrees and follow the magnet when it is swung by the yoke in being moved lengthwise of the lever.

Although the housing itself can have a flat metal surface engaged by the magnet and along which it can be moved, it is preferred to use a steel bracket for this purpose which has a flat base plate 36 rigidly secured to the adjoining housing wall. At one side of the lever the bracket has an integral leg 37 that extends outwardly along shaft 32 and integrally connects a foot 38 (FIG. 1), projecting from the edge of the plate, with a parallel ear 39 at the outer end of the leg. The foot and ear are provided with aligned holes, in which the shaft is journaled. The shaft is prevented from moving outwardly by means of a cotter key 40 that extends through it beneath a washer 41 engaging the lower surface of the ear. The bracket plate need be only wide enough to prevent the magnet from projecting from its side edge when the magnet is swung from either of its extreme positions to the other.

With this invention, it is very easy to adjust the lever fulcrum along the lever in order to control the pressure that is necessary for opening the valve.

I claim:

1. A valve comprising a housing provided with a port, a movable closure member for the port, shifting means in the housing responsive to changing fluid pressure therein at one side of the shifting means for moving said closure member, a steel lever having a side facing the housing and having one end pivotally connected with said shifting means and movable thereby, and a magnet between the lever and housing having a surface normally engaged by said side of the lever and having an edge serving as a fulcrum for the lever, said housing being provided with a metal surface engaged by the magnet and to which it is attracted for holding the magnet, the magnet resisting tilting of the lever on said fulcrum edge by the shifting means until fluid pressure against said side of the shifting means differs from the pressure against the opposite side thereof sufficiently to overcome the attraction of the magnet for the lever, and the magnet being adjustable lengthwise of the lever along said metal surface to change the distance between said fulcrum edge and said end of the lever, whereby to vary the resistance of the lever to being tilted by said shifting means.

2. A valve according to claim 1, in which said lever has side flanges overlapping opposite sides of the magnet.

3. A valve according to claim 1, including manually operable means for swinging said magnet in an arc lengthwise of the lever to effect said adjustment of the magnet.

4. A valve according to claim 1, in which said lever has side flanges overlapping opposite sides of the magnet and is swingable laterally on said one end, the valve including a magnet holder movable parallel to the lever, means pivoting said holder on an axis at one side edge of the lever, and means for turning said holder on said axis to cause the magnet to swing the lever and move lengthwise of it.

5. A valve according to claim 4, in which said metal surface is formed by a steel bracket supported by said housing, and said holder-pivoting means is supported by the bracket.

6. A valve comprising a housing provided in one side with a port, a closure member normally closing the port, shifting means in the housing responsive to increased fluid pressure therein at the side of the shifting means opposite said port for pushing the closure member away from the port, the shifting means having at its said side a stem slidably mounted in the adjacent wall of the housing, a steel lever outside the housing extending across said wall and having an inner end pivotally connected to the outer end of said stem and movable thereby toward the housing, and a magnet between the lever and said housing wall having an outer surface normally engaged by the lever and having an edge serving as a fulcrum for the lever, said wall being provided with a metal surface engaged by the magnet and to which it is attracted for holding the magnet, the magnet restraining tilting of the lever on said fulcrum edge by the shifting means until fluid pressure against said side of the shifting means rises to a predetermined value that will overcome the attraction of the magnet for the lever, and the magnet being adjustable lengthwise of the lever along said metal surface to change the distance between said fulcrum edge and inner end of the lever, whereby to vary the resistance of the lever to being tilted by said shifting means.

7. A valve according to claim 6, in which said shifting means includes a flexible diaphragm separating the housing into two chambers, and said stem extends from the center of the diaphragm through the center of said housing wall.

8. A valve according to claim 6, in which said lever has side flanges overlapping opposite sides of the magnet and also has an opening through its inner end receiving said stem, the valve including a magnet holder movable parallel to the lever, means pivoting said holder on an axis at one edge of the lever, and means for turning said holder on said axis to cause the magnet to swing the lever around said stem and move lengthwise of the lever.

References Cited in the file of this patent

UNITED STATES PATENTS

| | | |
|---|---|---|
| 1,875,511 | Shivers | Sept. 6, 1932 |
| 2,575,086 | Atchison | Nov. 13, 1951 |
| 3,031,011 | Dawson et al. | Apr. 24, 1962 |